United States Patent [19]

Falk

[11] 4,159,855
[45] Jul. 3, 1979

[54] LOAD SENSING PROPORTIONING VALVE

[75] Inventor: Edward J. Falk, St. Louis, Mo.

[73] Assignee: Wagner Electric Corporation, Parsippany, N.J.

[21] Appl. No.: 874,801

[22] Filed: Feb. 3, 1978

[51] Int. Cl.² ............................................. B60T 8/14
[52] U.S. Cl. ............................... 303/24 F; 303/6 C; 303/22 R
[58] Field of Search ............ 188/195; 303/6 C, 22 R, 303/24 A, 24 C, 24 F

[56] References Cited
U.S. PATENT DOCUMENTS

3,950,037  4/1976  Pembleton et al. ............... 303/24 F

Primary Examiner—Duane A. Reger
Attorney, Agent, or Firm—D. F. Marquette

[57] ABSTRACT

A valve for use in vehicle hydraulic brake systems for the purpose of limiting the rear wheel brake pressure relative to the front wheel brake pressure in order to reduce the potential for premature rear wheel lock. The valve includes a proportioning piston which operates to limit the fluid pressure delivered to the rear wheel brakes and an inertia member which senses changes in vehicle loading. When a vehicle is fully loaded, the inertia member remains in a position where it will disable the proportioning piston in its open position and, consequently, the rear wheel brake pressure will be equal to the front wheel brake pressure. When the same vehicle is unloaded, the inertia member moves in response to deceleration to a position where it will not disable the proportioning piston so that the rear wheel brake pressure will be reduced relative to the front wheel brake pressure.

21 Claims, 9 Drawing Figures

LOAD SENSING PROPORTIONING VALVE

BACKGROUND OF THE INVENTION

It is known that changes in vehicle loading cause changes in braking capability. For instance, when a vehicle is in the fully loaded condition, the rear wheels will have nearly the same braking capability as the front wheels. However, when the same vehicle is in the unladen condition, the rear wheels may have substantially less braking capability than the frontwheels. Thus, the potential for premature rear wheel lock may be much greater when stopping the unladen vehicle than when stopping the fully loaded vehicle. This is particularly apparent in truck-type vehicles and subcompact passenger vehicles.

Vehicle hydraulic brake systems have included various types of pressure proportioning valves which reduce the potential for premature rear wheel lock during brake applications. Conventional proportioning valves limit the rear wheel brake pressure relative to the front wheel brake pressure in response to a predetermined level of master cylinder pressure. One such type of proportioning valve is shown in U.S. Pat. No. 3,423,936. In the unladen vehicle condition, this type of valve is advantageous since it prevents premature rear wheel lock yet allows the brake system to produce the total brake torque that is needed for stopping the unladen vehicle in a predetermined distance. However, this type of valve is not entirely desirable in the fully loaded vehicle condition when there is a substantial difference between the fully loaded weight and the unladen weight of a vehicle such as in a truck. The principal reason that this type of valve may be undesirable in the fully loaded condition is that the brake system may not be able to produce the total brake torque that is needed for stopping the fully loaded vehicle in the same distance as the unladen vehicle.

In an attempt to overcome this problem, a similar type of proportioning valve has included a "blend-back" type bypass feature which steadily increases the rear brake pressure subsequent to a predetermined period when the rear brake pressure is limited. The brake system is thus able to provide the total brake torque that is needed for stopping the fully loaded vehicle in the same distance as the unladen vehicle. This type of valve has a disadvantage in that the wear rate of the front brakes is increased when the vehicle is fully loaded. Another disadvantage of this type of valve is that the potential for front wheel lock is increased when stopping the fully loaded vehicle on wet or icy surfaces.

These undesirable features and disadvantages of the prior art proportioning valves are more evident on truck-type vehicles and subcompact passenger automobiles than on intermediate and full-size passenger vehicles.

SUMMARY OF THE INVENTION

The present invention improves the braking capability of the unladen vehicle while maintaining the designed braking capability of the fully loaded vehicle. The present invention includes means which automatically senses vehicle loading conditions so that the rear wheel brake pressure is limited when a vehicle is unladen but is not limited when the same vehicle is fully loaded.

The present invention provides a proportioning valve which includes an inlet, an outlet and valve means for regulating fluid flow between the inlet and the outlet. The valve means includes a movable valve member for restricting the fluid path between the inlet and the outlet. The present invention also provides means for disabling the movable valve member. When the vehicle is fully loaded, the means for disabling engages the movable valve member and prevents it from restricting the fluid path. When the same vehicle is unloaded or lightly loaded, the means for disabling moves to a location which frees the movable valve member and allows it to restrict the fluid path.

BRIEF DESCRIPTION OF THE DRAWINGS

In the drawings wherein like numerals designate like parts.

DETAILED DESCRIPTION—FIRST EMBODIMENT

Figure 1:
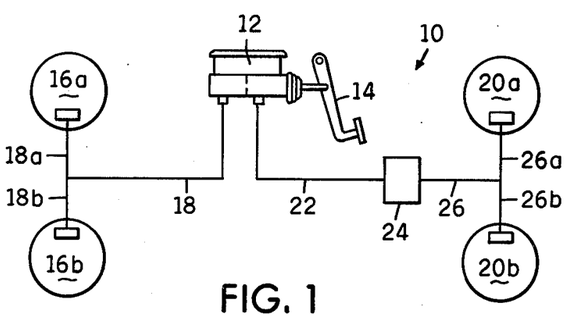
FIG. 1 is a schematic view of a brake system incorporating a proportioning valve according to the present invention.

Referring now to the drawings, a portion of a brake system 10 is generally illustrated in FIG. 1 and includes standard components such as master cylinder 12 operated by a brake pedal 14. Brake fluid in the master cylinder 12 is delivered to the front brake wheel cylinders 16a, 16b via conduit 18 and branch conduits 18a, 18b. Brake fluid is also delivered to rear brake wheel cylinders 20a, 20b via conduit 22, proportioning valve 24, conduit 26 and branch conduits 26a, 26b.

Figures 2, 2A:
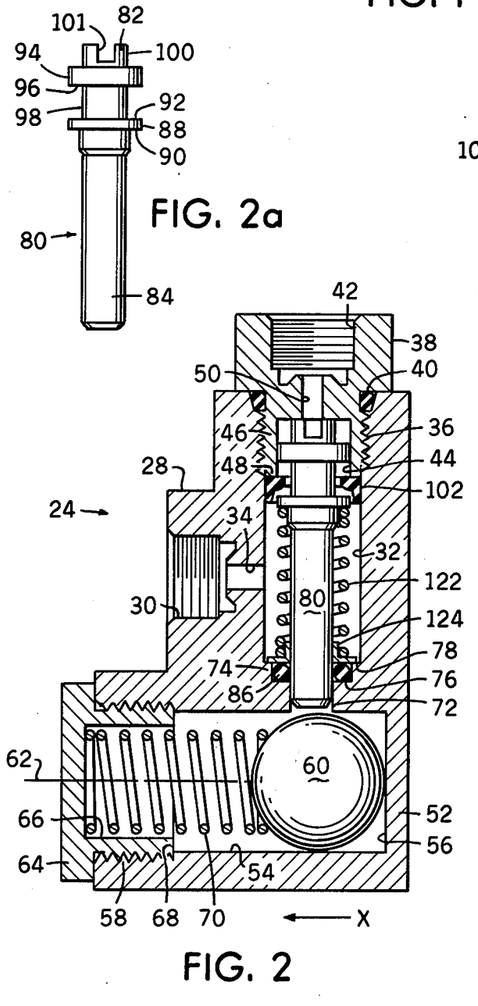
FIG. 2 is an enlarged vertical sectional view of the proportioning valve of the present invention.
FIG. 2a is a view of one of the parts of the proportioning valve illustrated in FIG. 2.

The novel proportioning valve 24 as shown in detail in FIG. 2 includes a housing 28 preferably formed of a suitable metal. The housing 28 has an inlet opening 30 for receiving conduit 22. The housing 28 also includes a central cavity 32 which is connected to the inlet opening 30 by the fluid passage 34. The cavity 32 includes a threaded portion 36 at its upper end. A fitting 38 having a hexagonal head and a threaded portion is received in the threaded portion 36 of the cavity 32. A seal 40 is disposed between the housing 28 and the fitting 38 to prevent leakage of fluid. The fitting 38 includes an outlet opening 42 for receiving conduit 26. The fitting 38 also includes a central bore 44 open toward the cavity 32 and disposed coaxially therewith. Bore 44 defines a peripheral wall 46 having a bottom annular surface 48. A fluid passage 50 connects the central bore 44 and the outlet opening 42 of the fitting 38.

Housing 28 further includes a lower hollow portion 52 defining a chamber 54, preferably cylindrical, with a closed end 56 and an open end 58. A weighted member 60, preferably spherical, is positioned in the chamber 54. In this particular embodiment of the invention, the weighted member 60 rolls or slides in response to vehicle deceleration along the longitudinal axis 62 of the chamber 54. A plug 64 is threadedly disposed in the open end 58 of the chamber 54. The plug 64 includes a central bore 66 and an annular end surface 68. The rolling or sliding movement of the weighted member 60 to the right in FIG. 2 is limited by the closed end 56 of chamber 54 and the rolling or sliding movement of the weighted member 60 to the left in FIG. 2 is limited by the annular end surface 68 of the plug 64. A coil spring 70 is positioned in the central bore 66 of the plug 64 and normally biases the weighted member 60 toward the right in FIG. 2. Since the weighted member 60 moves in response to vehicle deceleration, it will hereafter be referred to as the inertia weight 60.

Housing 28 also has a bore 72 of a smaller diameter than cavity 32 connecting the chamber 54 and the cavity 32. Another bore 74 of a diameter greater than bore 72 but smaller than cavity 32 is provided intermediate bore 72 and cavity 32 and defines annular shoulders 76 and 78. The bores 44, 72 and 74 are disposed coaxially with respect to each other and to the cavity 32.

A movable valve member such as valve piston 80 is disposed in the cavity 32 and has its upper and lower end portions 82 and 84 slidably positioned in the bores 44 and 72, respectively. An O-ring seal 86 is provided in the bore 74 contacting the shoulder 76 and the piston lower end portion 84 to prevent fluid flow from the cavity 32 to the chamber 54. With the O-ring seal 86 in position, it should be noted that the chamber 54 will be kept free of brake fluid and maintained at atmospheric pressure. However, it is possible that a small amount of fluid could leak past the O-ring seal 86 downwardly into the chamber 54 if, for example, the seal becomes worn. Therefore, if desired, a well-known weep valve (not shown) could be installed in the chamber 54 to exhaust any leaked fluid to the atmosphere.

The valve piston 80 includes a radially extending annular flange 88 having an annular shoulder 90 on the bottom side and an annular shoulder 92 on the top side thereof. The valve piston 80 further includes an enlarged portion 94 extending radially outwardly above the flange 88. The enlarged portion 94 has an annular shoulder 96 which forms a valve head. The outside diameter of the enlarged portion 94 is slightly less than the inside diameter of the bore 44 of the fitting 38 so as to allow fluid flow around the enlarged portion 94. Valve piston 80 also includes a reduced diameter cylindrical portion 98 between the annular shoulders 92 and 96. Valve piston 80 further includes an upper cylindrical portion 100 above the enlarged portion 94. A notch 101 extends transversely through the upper cylindrical portion 100 to allow fluid flow.

Figures 3, 4:
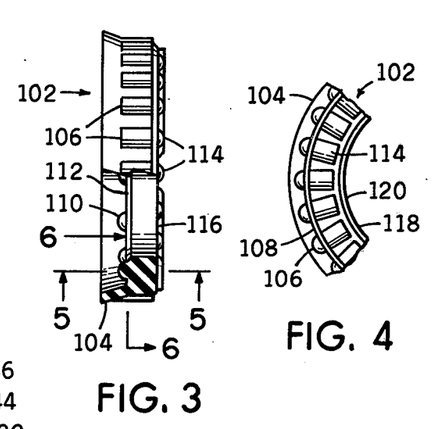
FIG. 3 is an enlarged view, partly in section and partly in elevation, of one of the parts of the proportioning valve illustrated in FIG. 2.
FIG. 4 is an end view of a portion of the valve element illustrated in FIG. 3.
Figure 5:
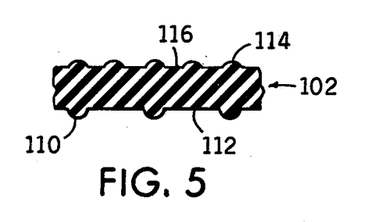
FIG. 5 is a sectional view of the valve element of FIG. 3 taken along lines 5—5 thereof.
Figure 6:
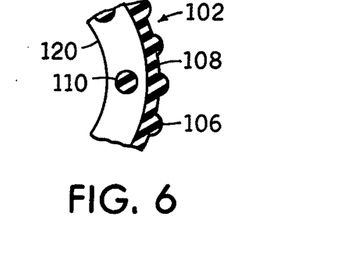
FIG. 6 is a sectional view of a portion of the valve element of FIG. 3 taken along lines 6—6 thereof.

A stationary valve member such as elastomeric valve element 102 is disposed in the cavity 32 and surrounds the reduced cylindrical portion 98 of valve piston 80. When the valve element 102 is in the position shown in FIG. 2, it engages the wall of the cavity 32 and the bottom annular surface 48 of the fitting 38. As seen in FIGS. 3 and 4, the valve element 102 has a depending lip 104 which extends downwardly and outwardly when the valve element 102 is in its free state. When the valve element 102 is installed in the cavity 32, the lip 104 is forced inwardly and, consequently, forms a seal against the wall of the cavity 32 to prevent upward fluid flow around the lip 104 from the cavity 32 to the outlet opening 42.

The valve element 102 includes a plurality of angularly spaced ribs 106 which extend radially from the outer peripheral surface 108 thereof and contact the wall of the cavity 32 above the lip 104. Valve element 102 further includes a plurality of semispherical bosses 110 which extend downwardly from the lower side 112 thereof for engagement with the annular shoulder 92 of valve piston 80. The spaces between the bosses 110 define fluid passages for upward fluid flow. Valve element 102 also includes a plurality of angularly spaced ribs 114 which extend upwardly from the upper side 116 thereof for contacting the bottom annular surface 48 of the fitting 38. As seen in FIG. 4, the ribs 106 are angularly aligned with the ribs 114 to allow downward fluid flow around the lip 104 from the outlet opening 42 to the cavity 32. As also seen in FIG. 4, the valve element 102 further includes a rounded portion 118 adjacent the upper end of its inner peripheral surface 120 for engaging the annular shoulder 96 or valve head of the valve piston 80. The rounded portion 118 forms a valve seat.

When the proportioning valve 24 is assembled as shown in FIG. 2, it will be seen that the diameter of the reduced portion 98 of valve piston 80 is less than the diameter of the inner peripheral surface 120 of the valve element 102 so as to define an annular fluid passage therebetween. Also, the outer diameter of the flange 88 of valve piston 80 is less than the inside diameter of the lip 104 of the valve element 102 thereby defining an annular fluid passage therebetween. These fluid passages combined with the previously mentioned fluid passages between the bosses 110 of the valve element 102 define a direct fluid path for upward flow between the valve piston 80 and the valve element 102.

The valve piston 80 is normally biased upwardly in FIG. 2 by a coil spring 122 so that the upper end of the upper cylindrical portion 100 engages the end of the bore 44 of the fitting 38. Since the valve piston 80 is normally biased upwardly, a fluid passage is normally formed between the valve head 96 and the valve seat 118. The upper end of coil spring 122 engages the annular shoulder 90 on flange 88 of the valve piston 80. The lower end of coil spring 122 engages a retaining ring 124. The retaining ring 124 rests on the annular shoulder 78 of cavity 32 and surrounds the lower end portion 84 of the valve piston 80. The retaining ring 124 maintains the coil spring 122 in vertical alignment with the valve piston 80.

An unrestricted fluid passage is provided through proportioning valve 24 with the valve piston 80 in the position shown in FIG. 2 so that the fluid pressure at the outlet opening 42 will be equal to the fluid pressure at the inlet opening 30 or in the master cylinder 12. The operation of the valve piston 80 and the valve element 102 to provide a restricted fluid passage to the outlet opening 42 will be explained hereafter. However, it will be noted that the coil spring 122 determines at what fluid pressure level the valve piston 80 and the valve element 102 will begin to restrict the fluid passage through the proportioning valve 24. This fluid pressure level is hereafter referred to as the split point pressure and the coil spring 122 is hereafter referred to as the split point spring 122.

Valve Operation—First Embodiment

Referring now to FIG. 2, the proportioning valve 24 is mounted on a vehicle with the longitudinal axis 62 of the chamber 54 lying parallel to the horizontal and the arrow X facing toward the front of the vehicle. With the proportioning valve 24 in this position, the inertia weight 60 is biased by coil spring 70 to a first position adjacent the closed end 56 of the chamber 54 thereby obstructing the movement of the valve piston 80. The coil spring 70 determines at what vehicle deceleration level the inertia weight 60 will move forward toward the open end 58 of the chamber 54 to allow free movement of the valve piston 80. Thus, the level of vehicle deceleration which causes the inertia weight 60 to move toward the open end 58 of the chamber 54 is preselected and depends on the compressive force of the coil spring 70.

The coil spring 70 may be increased or decreased in compressive force to achieve the desired movement of the inertia weight 60. For example, if the coil spring 70 is decreased in force, the inertia weight 60 will move forward at a level of vehicle deceleration which is lower than the original preselected level of deceleration. Conversely, if the coil spring 70 is increased in force, the inertia weight 60 will move forward at a level of vehicle deceleration which is higher than the original preselected level of deceleration.

Alternatively, in lieu of the coil spring 70, the proportioning valve 24 may be mounted on the vehicle with the longitudinal axis 62 of the chamber 54 lying at an acute angle to the horizontal so that the closed end 56 of the chamber 54 is at a lower level than the open end 58 thereof. This valve mount angle provides the same function as the coil spring 70 and may be adjusted, i.e. increased or decreased, to achieve the desired movement of the inertia weight 60.

I. UNLADEN VEHICLE CONDITION

During deceleration due to a braking application of the vehicle when unloaded or lightly loaded (hereafter referred to as the unladen vehicle), the inertia weight 60 rests in its first position against the closed end 56 of the chamber 54, as seen in FIG. 2, until the preselected level of deceleration is reached. When the unladen vehicle attains this preselected level, the inertia weight 60 will begin to move forward against the force of coil spring 70 toward the open end 58 of chamber 54 before the fluid pressure at the inlet opening 30 attains the predetermined level known as the split point pressure. As the vehicle exceeds the preselected deceleration level, the inertia weight 60 continues to move forward against the force of the coil spring 70 to a second position adjacent the end surface 68 of the plug 64. The fluid pressure in the master cylinder 12 required for the unladen vehicle to reach the preselected deceleration level is known as the unladen actuation pressure. Thus, for an unladen vehicle, the unladen actuation pressure must be less than the split point pressure in order for the proportioning valve 24 to limit the fluid pressure delivered to the rear brake wheel cylinders 20a, 20b.

The proportioning valve 24 provides a path for the direct transmission of fluid pressure from the inlet opening 30 to the outlet opening 42 when the valve piston 80 is in the position shown in FIG. 2 as already described. During a braking application, this path remains open with the pressure at the outlet opening 42 increasing at the same rate as the pressure at the inlet opening 30 until the predetermined split point pressure is reached at the inlet opening 30 as represented by the line connecting the points 126 and 128 in FIG. 7. Before reaching the predetermined split point pressure at inlet opening 30, the unladen actuation pressure is attained and produces the preselected level of deceleration so that the inertia weight 60 moves forward against the force of coil spring 70 to its second position adjacent the end surface 68 of the plug 64. When the fluid pressure delivered to the inlet opening 30 is then increased due to the continued braking application and attains the predetermined split point value represented by the point 128 in FIG. 7, the valve piston 80 moves downward against the force of the split point spring 122 to a position where the valve head 96 of the valve piston 80 contacts the valve seat 118 of the valve member 102 and thus closes the fluid path. Thereafter, the relationship between the pressure at outlet opening 42 and the pressure at inlet opening 30 will be generally represented by the line connecting the points 128 and 130 in FIG. 7. $P_2$ hereinafter refers to the pressure at the outlet opening 42. $P_1$ hereinafter refers to the pressure at the inlet opening 30 or the pressure in the master cylinder 12.

The predetermined level of split point pressure is dependent upon the force of the split point spring 122 compared to the effective area of the valve piston 80 acted upon by fluid pressure in a direction opposing the force of the split point spring 122. This effective area is equal to the cross-sectional area of the valve piston lower end portion 84 since the bottom end of that portion is sealed off from the inlet fluid pressure ($P_1$) by the O-ring seal 86 while fluid pressure acts against all of the remaining portions of the valve piston 80. During the lower ranges of master cylinder pressure ($P_1$), the fluid pressure acting on the effective area of the valve piston 80 produces a downward force which is insufficient to overcome the force of the split point spring 122. Assuming that $P_1$ equals the fluid pressure at the inlet opening 30, A equals the cross-sectional area of the valve piston end portion 84, and S equals the force of the split point spring 122, then the valve piston 80 will close the fluid path (that is, valve head 96 will move into engagement with valve element seat 118) when $P_1$ times A is greater than S.

The operation of the proportioning valve 24 to regulate the fluid flow between the inlet opening 30 and the outlet opening 42 will now be explained. This operation of the proportioning valve 24 is represented by the line connecting the points 128 and 130 in FIG. 7.

After the valve head 96 closes against the valve element seat 118 and the fluid pressure at the inlet opening 30 is further increased by the master cylinder 12, the increased level of fluid pressure will act against the valve piston 80 over an effective circular area having a diameter equal to the main sealing diameter of the valve head 96 (hereinafter referred to as B) less the area A. This produces an upward force on the valve piston 80 assisting the split point spring 122 and tending to reopen the valve piston 80 to deliver at least a portion of this increased fluid pressure to the outlet opening 42. However, any of this increased fluid pressure delivered to the outlet opening 42 creates an opposing downward force on the valve piston 80 acting over the area B. This, of course, tends to reclose the valve piston 80 against the valve element 102.

These opposing forces on valve piston 80 tend to keep the valve head 96 closely adjacent to the valve seat 118 for the restricted flow of fluid from the inlet opening 30 to the outlet opening 42 to create a pressure at the outlet opening 42 which increases at a lower rate than the pressure at the inlet opening 30. The ratio of the pressures ($P_1/P_2$) is determined by the relationship of the effective areas (A and B) previously mentioned.

After the proportioning valve 24 first closes (i.e. valve head 96 initially engages valve element seat 118), the increase in pressure at the inlet opening 30 (hereinafter referred to as $\Delta P_1$) will produce an increase in pressure at the outlet opening 42 (hereinafter referred to as $\Delta P_2$) in accordance with the following formula:

$$\Delta P_1 \frac{B-A}{B} = \Delta P_2.$$

Similarly, if we assume $P_2$ is the pressure at the outlet opening 42 then $P_2(B) = [P_1(B-A)] + S$ after the valve piston 80 becomes operative (i.e. after the valve head 96 engages valve seat 118). Accordingly, the fluid pressure existing in the front brake wheel cylinders 16a, 16b will be greater than the fluid pressure existing in the rear brake wheel cylinders 20a, 20b when the master cylinder pressure $P_1$ surpasses the unladen actuation pressure and then exceeds the split point pressure.

During that portion of a brake application in which the applied pedal effort is reduced subsequent to a pedal effort of sufficient intensity to have moved the valve piston 80 to the restricted flow position, $P_1$ acting on the area B−A is reduced. Thus, the forces tending to move the valve piston 80 upwardly toward the outlet opening 42 are reduced and the valve piston 80 moves downwardly under the influence of the pressure at the outlet opening 42 ($P_2$) acting on the area B. As the valve piston 80 moves downward, its valve head 96 slides within the inner peripheral surface 120 of the valve element 102, thereby increasing the available volume for the fluid at the rear brake wheel cylinders 20a, 20b and thereby accomplishing a reduction in $P_2$. The valve piston 80 will continue its downward movement in an effort to reduce $P_2$ to satisfy the previously mentioned formula: $P_2(B) = P_1[(B-A)] + S$.

However, the valve piston 80 may not completely achieve this result because of the limited possible downward travel thereof. During the descent in brake pressure, the pressure at the outlet opening 42 can never be greater than the pressure at the inlet opening 30. This is because the fluid at the outlet opening 42 is able to flow downwardly around the valve element 102 between the lip 104 and the wall of the cavity 32 if the fluid pressure in the cavity 32 is at a lower level. The lip 104 of the valve element 102 accordingly functions as a relief valve to prevent rear brake pressure ($P_2$ at outlet opening 42) from ever being greater than front brake pressure ($P_1$ at master cylinder 12 or inlet opening 30).

When the pressure at the inlet opening 30 is reduced beneath the level at which the proportioning valve 24 originally closed, the valve piston 80 will be moved upwardly by the split point spring 122 to reopen the fluid passage between the valve head 96 and valve seat 118. Thereafter, when vehicle deceleration no longer exceeds the original preselected level at which the inertia weight 60 moves forward, the coil spring 70 will return the inertia weight 60 to its first position.

It should now be apparent that when the proportioning valve 24 is mounted on an unladen vehicle, the inertia weight 60 will respond to a preselected level of vehicle deceleration and move forward against the force of the coil spring 70 toward the open end 58 of the chamber 54 before the pressure at the inlet opening 30 reaches the predetermined value known as the split point. Prior to the inlet pressure reaching the split point value, there is direct communication between the inlet opening 30 and the outlet opening 42. When the inlet pressure exceeds the split point value, the proportioning valve 24 limits the pressure at the outlet opening 42 provided that the inertia weight 60 has moved toward and rests adjacent the annular end surface 68 of the plug 64.

II. LADEN VEHICLE CONDITION

If the same vehicle is now loaded in excess of a preselected weight (hereinafter referred to as the laden vehicle), the laden actuation pressure (i.e. the fluid pressure in the master cylinder 12 required for the laden vehicle to reach the preselected level of deceleration due to a braking application) will be greater than both the unladen actuation pressure and the split point pressure. In designing the proportioning valve 24, a deceleration level is chosen at which rear brake pressure limiting is to be initiated on the unladen vehicle. Then the unladen and the laden actuation pressures are determined. Lastly, the split point pressure is designed to be greater than the unladen actuation pressure, but less than the laden actuation pressure. The operation of proportioning valve 24 on an unladen vehicle where the split point pressure is greater than the unladen actuation pressure has already been fully described.

During deceleration of the laden vehicle due to a braking application, the inertia weight 60 will remain in its first position adjacent the closed end 56 of the chamber 54 as seen in FIG. 2 even though the preselected level of deceleration may be reached and exceeded. This is accomplished because the fluid pressure at the inlet opening 30 attains the split point value before the laden actuation pressure produces the preselected level of deceleration. When the split point pressure is reached, the valve piston 80 moves downward slightly and contacts the inertia weight 60. The physical contact between the valve piston 80 and the inertia weight 60 traps and prevents forward movement of the inertia weight 60 at deceleration levels above the preselected deceleration level. Further downward movement of the valve piston 80 is obstructed by the inertia weight 60 thereby preventing the closing of the fluid path through the proportioning valve 24 (i.e. valve head 96 does not engage valve seat 118). This results in the pressure at the outlet opening 42 increasing at the same rate as the pressure at the inlet opening 30 for the full range of inlet pressure as shown by the line connecting points 126, 128 and 132 in FIG. 7.

In summary, the inertia weight 60 provides a means for automatically disabling the valve piston 80 depending upon the vehicle loading condition. The inertia weight 60 is movable from a first position wherein it obstructs the normal movement of the valve piston 80 to a second position wherein the valve piston 80 is free to move. The movement of the inertia weight 60 is dependent upon the loading of the vehicle. If the vehicle is unloaded or lightly loaded, the inertia weight 60 will move to its second position during braking and will not disable or obstruct the normal movement of the valve piston 80. However, if the vehicle is loaded in excess of a preselected weight, the inertia weight 60 will be trapped in its first position during braking and will disable or obstruct the normal movement of the valve piston 80.

DETAILED DESCRIPTION—SECOND EMBODIMENT

Figures 7, 8:
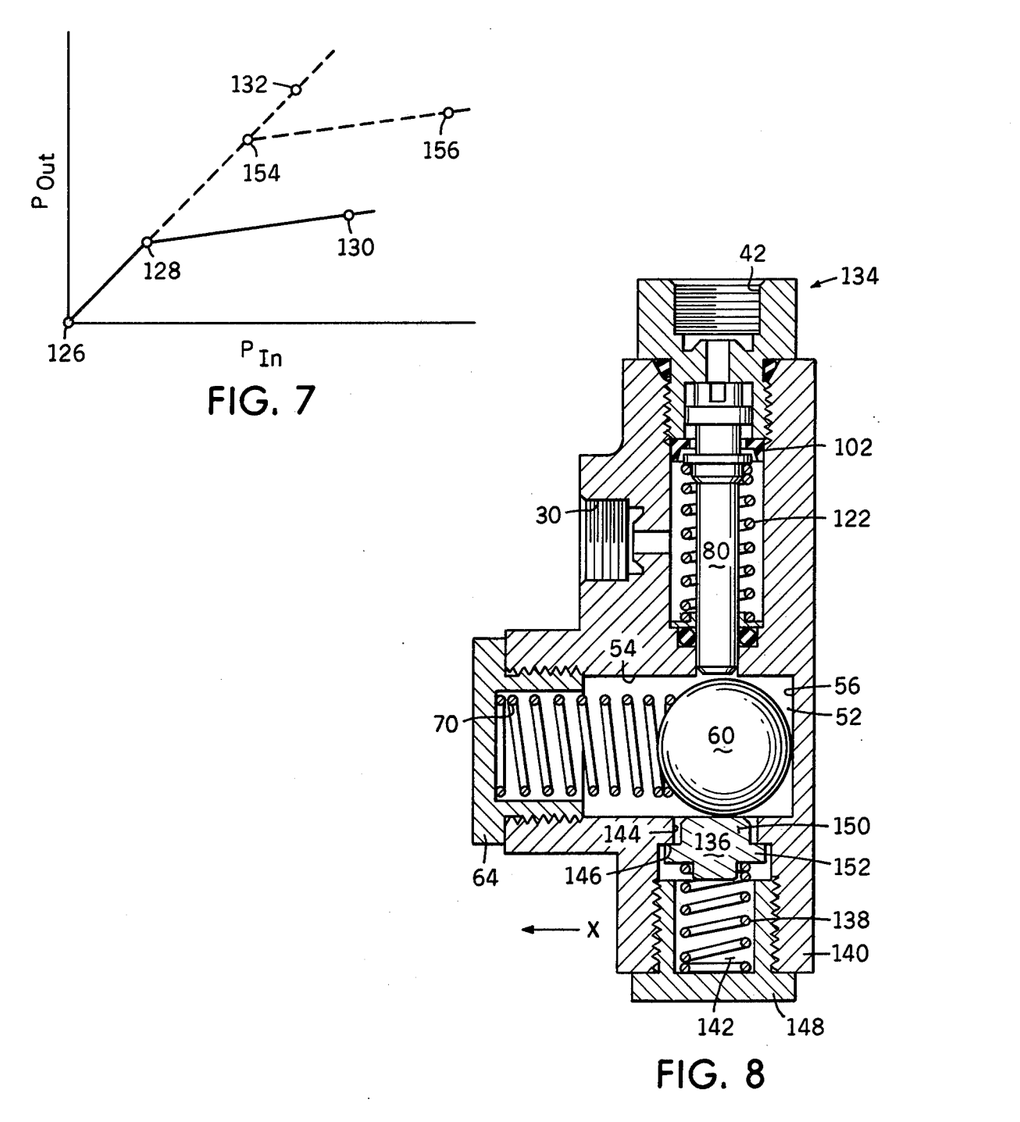
FIG. 7 is a graph comparing inlet pressure and outlet pressure of the proportioning valve of FIG. 2.
FIG. 8 is an enlarged vertical sectional view of a second embodiment of the proportioning valve of the present invention.

A second embodiment of the novel proportioning valve which incorporates an optional feature to provide additional pressure modulation is illustrated at 134 in FIG. 8. The proportioning valve 134 is identical to proportioning valve 24 previously described except that it includes a movable ball rest member 136 and a second split point spring 138. The housing of proportioning valve 134 includes a boss 140 extending downwardly from the lower hollow portion 52. The boss 140 has a central chamber 142 which is connected to the chamber 54 by a passage 144 thereby forming an annular shoulder 146 in the upper end of the chamber 142. A cap 148 is threadedly received in the lower end of the chamber 142. Disposed in the chamber 142 is the ball rest member 136 including an upper portion 150 and an annular flange portion 152. The split point spring 138 biases the ball rest member 136 upwardly so that the annular flange portion 152 contacts the annular shoulder 146 and the upper portion 150 extends through the passage 144. Prior to a braking application, the inertia weight 60 is in its rearward position contacting the closed end 56 of the chamber 54 and resting on the upper portion 150 of the ball rest member 136 as seen in FIG. 8.

VALVE OPERATION—SECOND EMBODIMENT

The proportioning valve 134 is mounted on a vehicle with the longitudinal axis 62 of the chamber 54 lying parallel to the horizontal and the arrow X facing toward the front of the vehicle.

I. UNLADEN VEHICLE CONDITION

During deceleration of an unladen vehicle, the proportioning valve 134 operates in the same manner as the proportioning valve 24 to limit the fluid pressure in the rear brake wheel cylinders 20a, 20b.

II. LADEN VEHICLE CONDITION

During deceleration of a laden vehicle, the split point pressure is attained before the vehicle reaches the preselected level of deceleration thereby moving the valve piston 80 downward slightly against the force of split point spring 122 into contact with the inertia weight 60. When this happens, the inertia weight 60 is trapped and is no longer free to roll or slide. Further downward movement of the valve piston 80 is prevented by the combined forces of split point springs 122 and 138 until the fluid pressure delivered to the inlet opening 30 attains a second predetermined split point value represented by the point 154 in FIG. 7. When this second split point pressure is reached, the inlet pressure $P_1$ acting on the effective area A of the valve piston 80 overcomes the combined forces of split point springs 122 and 138 thereby closing the fluid path through the proportioning valve 134 (i.e. valve piston 80 moves downward so that valve head 96 engages valve seat 118). After the initial closing, the operation of the proportioning valve 134 to limit the fluid pressure in the rear brake wheel cylinders 20a, 20b is similar to the operation of the proportioning valve 24 in the unladen vehicle condition. The relationship between the outlet pressure and the inlet pressure during this phase of operation of the proportioning valve 134 is represented generally by the line connecting points 154 and 156 in FIG. 7. Thus, this embodiment of the invention provides two distinct split point values which depend on the loading of the vehicle.

It will be noted that the invention is not limited to the particular type of housing 28 which is shown and described herein only for the purposes of illustration.

It will be understood that the invention is not limited to including the particular type of valve means such as valve piston 80 and valve element 102. Accordingly, other types of valve means which have a movable valve member for restricting a fluid path may be used. It will be also understood that the invention is not limited to including the particular type of means for disabling or obstructing movement of the valve piston 80 such as spherical inertia weight 60, and any other means which will obstruct movement of the valve piston 80 such as another piston may be used.

It is apparent that the invention is not limited to including a means for disabling or obstructing movement of the valve piston 80 which is inertia responsive such as inertia weight 60. Accordingly, other means such as solenoid operated rod and linkage mechanisms, push-pull rod and linkage mechanisms, and rod and linkage mechanisms actuated by vehicle positional changes due to loading may be employed for effecting movement of the disabling means.

It will be understood that the claims are intended to cover all modifications and variations of the preferred embodiment of the invention, herein chosen for the purpose of illustration, without departing from the spirit and scope of the invention.

I claim:

1. A valve for a vehicle hydraulic brake system comprising:
   (a) an inlet and an outlet;
   (b) a valve member interposed between said inlet and said outlet, said valve member being movable between an ope position and a closed position for controlling the pressure relationship between said inlet and said outlet; and
   (c) means operative when only the load carried by the vehicle exceeds a single preselected weight level for disabling said valve member in its open position during the entire range of inlet pressure so that the pressure at said outlet will be equal to the pressure at said inlet for all levels of inlet pressure.

2. A valve for a vehicle hydraulic brake system comprising:
   (a) an inlet for connection to a master cylinder and an outlet for connection to a wheel brake cylinder;
   (b) valve means interposed between said inlet and said outlet, said valve means having an open position for maintaining the pressure at said outlet equal to the pressure at said inlet and a closed position for limiting the pressure at said outlet relative to the pressure at said inlet; and
   (c) means operative only when the load carried by the vehicle exceeds a single preselected weight level for disabling said valve means in its open position during the entire range of inlet pressure so that the pressure at said outlet will be equal to the pressure at said inlet for all levels of inlet pressure.

3. In a vehicle hydraulic brake system which includes a master cylinder and a wheel brake cylinder, a pressure regulating device comprising:
   (a) valve means interposed between said master cylinder and said wheel brake cylinder, said valve means being movable between an open position and a closed position for controlling the pressure relationship between said master cylinder and said wheel brake cylinder; and
   (b) means operative only when the load carried by the vehicle exceeds a single weight level for disabling said valve means in its open position during the entire range of master cylinder pressure so that the pressure delivered to said wheel brake cylinder will be equal to the pressure in said master cylinder for all levels of master cylinder pressure.

4. A valve for a vehicle brake system comprisng:
(a) an inlet and an outlet;
(b) valve means positioned between said inlet and said outlet for transmitting fluid pressure at said outlet to said outlet, said valve means including a valve member being movable between an open position and a closed position for limiting the fluid pressure transmitted to said outlet relative to the fluid pressure at said inlet;
(c) disabling means being movable between a first position for engaging said valve member and a second position where it cannot engage said valve member;
(d) said disabling means being in said first position for engaging and holding said valve member in its open position during the entire range of inlet pressure when the load carried by the vehicle is above a preselected weight level so that the pressure at said outlet will be equal to the pressure at said inlet for all levels of inlet pressure; and
(e) said disabling means being in said second position when the load carried by the vehicle is below said preselected weight level whereby said valve member will be movable between its open and closed positions so that the pressure at said outlet will be limited relative to the pressure at said inlet.

5. The valve recited in claim 4, wherein said disabling means comprises inertia responsive means which is movable in response to a preselected level of vehicle deceleration from said first position into said second position only when the vehicle load is below said preselected weight level.

6. The valve recited in claim 5, further comprising resilient means normally urging said inertia responsive means toward said first position.

7. A valve for a vehicle brake system comprising:
(a) an inlet and an outlet;
(b) valve means positioned between said inlet and said outlet for transmitting fluid pressure at said inlet to said outlet, said valve means including a valve member being movable between an open position and a closed position for limiting the fluid pressure transmitted to said outlet relative to the fluid pressure at said inlet when the fluid pressure at said inlet is above a predetermined level;
(c) inertia responsive means being movable in response to a preselected level of vehicle deceleration from a first position for engaging said valve member to a second position where it cannot engage said valve member;
(d) said inertia responsive means remaining n said first position for engaging and holding said valve member in its open position when the pressure at said inlet reaches said predetermined level before said preselected level of vehicle deceleration is reached so that the pressure at said outlet will be equal to the pressure at said inlet; and
(e) said inertia responsive means moving into said second position when said preselected level of vehicle deceleration is reached before the pressure at said inlet reaches said predetermined level whereby said valve member will be movable between its open and closed positions so that the pressure at said outlet will be limited relative to the pressure at said inlet when the pressure at said inlet exceeds said predetermined level.

8. The valve recited in claim 7, wherein said inertia responsive means when in said first position becomes inoperative for holding said valve member in its open position when the pressure at said inlet is above another predetermined level that is higher than said first-mentioned predetermined level whereby said valve member will be movable between its open and closed positions so that the pressure at said outlet will be limited relative to the pressure at said inlet.

9. A valve for a vehicle hydraulic brake system of the type having a master cylinder for supplying fluid pressure to wheel brakes, said valve comprising:
(a) inlet and outlet means for transmitting fluid pressure from said master cylinder to at least one wheel brake;
(b) valving means positioned between said inlet and said outlet means for transmitting the fluid pressure at said inlet to said outlet and for limiting the fluid pressure transmitted to said outlet relative to the pressure at said inlet only when the fluid pressure at said inlet is above a single predetermined level; and
(c) inhibiting means for preventing said valving means from limiting the fluid pressure transmitted from said inlet to said outlet during the entire range of inlet fluid pressure in order to maintain the outlet fluid pressure equal to the inlet fluid pressure at all levels of master cylinder operating pressure.

10. The valve recited in claim 9, wherein
(a) said valving means includes a valve member movable between an open position and a closed position for limiting the pressure transmitted to said outlet relative to the pressure at said inlet when the fluid pressure is above said predetermined level; and
(b) said inhibiting means is operative to maintain said valve member in the opeh position so that the pressure at said outlet will be equal to the pressure at said inlet for all levels of master cylinder operating pressure when the load carried by the vehicle exceeds a predetermined weight level.

11. The valve recited in claim 9, wherein
(a) said valving means includes a valve member movable between an open position and a closed position for limiting the pressure transmitted to said outlet relative to the pressure at said inlet when the fluid pressure is above said predetermined level; and
(b) said inhibiting means is operative to maintain said valve member in the open position so that the pressure at said outlet will be equal to the pressure at said inlet for all levels of master cylinder operating pressure when the level of vehicle deceleration remains below a predetermined level.

12. The valve recited in claim 9, wherein
(a) said valving means includes a valve member movable between an open position and a closed position for limiting the pressure transmitted to said outlet relative to the pressure at said inlet;
(b) said inhibiting means is movable between a first position for engaging said valve member and a second position where it cannot engage said valve member; and
(c) said inhibiting means when in said first position maintains said valve member in the open position so that the outlet pressure is equal to the inlet pressure at all levels of master cylinder operating pressure.

13. The valve recited in claim 12, further comprising spring means for normally urging said inhibiting means toward said first position for engaging and maintaining said valve member in the open position when the load carried by the vehicle exceeds a predetermined weight level.

14. The valve recited in claim 12, further comprising spring means for normally urging said inhibiting means toward said first position and wherein said inhibiting means moves into said second position when a predetermined level of vehicle deceleration exists before said inlet fluid pressure reaches said predetermined level and wherein said inhibiting means remains in the first position when said predetermined level of fluid pressure exists and said predetermined level of vehicle deceleration has not been reached.

15. The valve recited in claim 14, wherein said valve member engages and traps said inhibiting means in said first position when said predetermined level of fluid pressure exists and said predetermined level of vehicle deceleration has not been reached.

16. The valve recited in claim 4, wherein said disabling means is inertia responsive.

17. The valve recited in claim 5, wherein said valve member comprises a valve piston and said inertia responsive means comprises an inertia weight.

18. The valve recited in claims 10, 11, or 12, wherein said inhibiting means is inertia responsive.

19. The valve recited in claims 10, 11, or 12, wherein said valve member comprises a valve piston and said inhibiting means comprises an inertia weight.

20. The valve recited in claim 7, wherein said valve member comprises a valve piston and said inertia responsive means comprises an inertia weight.

21. The valve recited in claim 20, wherein said valve piston engages and traps said inertia weight in said first position when said predetermined level of fluid pressure exists at said inlet and said preselected level of vehicle deceleration has not been reached.

* * * * *

UNITED STATES PATENT OFFICE
CERTIFICATE OF CORRECTION

PATENT NO. : 4,159,855
DATED : July 3, 1979
INVENTOR(S) : Edward J. Falk

It is certified that error appears in the above-identified patent and that said Letters Patent are hereby corrected as shown below:

Column 10, line 29, "ope" should read -- open --; line 32, "when only" should read -- only when --; line 64, after "single" insert -- preselected --. Column 11, line 3, "comprisng" should read -- comprising --; line 6, "outlet", second occurrence, should read -- inlet --; line 53, "n" should read -- in --. Column 12, line 36, "opeh" should read -- open --.

Signed and Sealed this

Eighth Day of January 1980

[SEAL]

Attest:

SIDNEY A. DIAMOND

Attesting Officer    Commissioner of Patents and Trademarks